US007117265B2

(12) United States Patent
Hamasaki et al.

(10) Patent No.: US 7,117,265 B2
(45) Date of Patent: Oct. 3, 2006

(54) SYSTEM FOR CONTROLLING COMMUNICATIONS IN A NETWORK BASED ON A PREVIOUS PLACE NAME AND RELOCATED PLACE NAME DISPLAYED ON TERMINALS OF CURRENT CONVERSATION PARTICIPANTS

(75) Inventors: Chizu Hamasaki, Kawasaki (JP); Hideki Takamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/465,077

(22) Filed: Jun. 19, 2003

(65) Prior Publication Data

US 2003/0229701 A1  Dec. 11, 2003

Related U.S. Application Data

(63) Continuation of application No. PCT/JP00/09123, filed on Dec. 21, 2000.

(51) Int. Cl.
*G06F 15/16* (2006.01)
(52) U.S. Cl. .................. 709/227; 709/204; 709/219; 709/225; 709/229; 455/457; 719/328
(58) Field of Classification Search ................ 709/204, 709/217, 219, 223, 225, 227, 229; 370/260; 455/457; 719/328
See application file for complete search history.

(56) References Cited

U.S. PATENT DOCUMENTS

| 6,169,902 | B1 | | 1/2001 | Kawamoto | |
|---|---|---|---|---|---|
| 6,240,069 | B1 | * | 5/2001 | Alperovich et al. | 370/260 |
| 6,396,814 | B1 | * | 5/2002 | Iwamura et al. | 370/256 |
| 6,456,854 | B1 | * | 9/2002 | Chern et al. | 455/457 |
| 6,477,387 | B1 | * | 11/2002 | Jackson et al. | 455/519 |
| 6,665,715 | B1 | * | 12/2003 | Houri | 709/223 |
| 6,782,436 | B1 | * | 8/2004 | Baker | 710/43 |
| 2001/0027107 | A1 | * | 10/2001 | Shinozaki et al. | 455/456 |
| 2004/0125790 | A1 | * | 7/2004 | Hiller et al. | 370/352 |

FOREIGN PATENT DOCUMENTS

| JP | 7-307935 | | 11/1995 |
|---|---|---|---|
| JP | 10-322436 | | 12/1998 |
| JP | 10-341487 | | 12/1998 |
| JP | 10341487 A | * | 12/1998 |
| JP | 11-072381 | | 3/1999 |
| JP | 11-136280 | | 5/1999 |
| JP | 11-187469 | | 7/1999 |
| JP | 2000-078313 | | 3/2000 |

* cited by examiner

*Primary Examiner*—Bharat Barot
*Assistant Examiner*—Oanh Duong
(74) *Attorney, Agent, or Firm*—Katten Muchin Rosenman LLP

(57) ABSTRACT

A communication system is arranged to efficiently control communications as being conscious of location information of a mobile body. The communication system includes an address list managing unit, a data supplying unit, a call connecting unit, a display unit, and a user interface. The address list managing unit stores and manages an address list about the location of each registered member. The data supplying unit generates data based on the address list so that the data can be disclosed on a Web site. The call connecting unit gives a call to a destination member specified by a user side for controlling a call connection. The display unit displays a screen image of the data to be referenced on the Web site. The user interface is used for specifying a destination member and a communication service type on the screen.

8 Claims, 22 Drawing Sheets

48a MEMBER REGISTRATION/MODIFICATION
DROP-DOWN LIST

| Member Registration/Modification | | | |
|---|---|---|---|
| Name | | | |
| Address | | | |
| New Registration | Overwrite | Modification | Deletion |
| | | OK | Cancel |

FIG. 6

110 ADDRESS LIST

| GROUP 11a | SUBGROUP 11b | MEMBER 11c | ADDRESS 11d | LOCATION 11e | ID NUMBER NOTICE 11f |
|---|---|---|---|---|---|
| Company | Work | AZUMA Kyoko | xxx. xxxx. xxxx. xxx | North Exit of the Kichijouji Station | OK |
| Company | Work | ITO Hanako | xxx. xxxx. xxxx. xxx | North Exit of the Kichijouji Station | OK |
| Company | Work | UENO Tarou | xxx. xxxx. xxxx. xxx | North Exit of the Kichijouji Station | OK |
| Company | Work | OTA Kouji | xxx. xxxx. xxxx. xxx | North Exit of the Kichijouji Station | OK |
| Company | Same-year Employees | ISHII Takashi | xxx. xxxx. xxxx. xxx | Fourth Street of Ginza | x |
| -------- | -------- | -------- | -------- | -------- | -------- |
| Company | Same-year Employees | SUZUKI Ryoko | xxx. xxxx. xxxx. xxx | Out of Range | OK |
| Company | Same-year Employees | KATO Takeshi | xxx. xxxx. xxxx. xxx | Before Shibuya 109 | x |

FIG. 12

| LOCATION | LATITUDE | LONGITUDE |
|---|---|---|
| Fourth Street of Ginza | × × × | × × × |
| North Exit of the Kichijouji Station | × × × | × × × |
| Sukiyabashi | × × × | × × × |
| ⋮ | ⋮ | ⋮ |

↗ t1

FIG. 13 t2 LIST OF CALLED MEMBERS MEMBER

| NO. | MEMBER | ADDRESS | STATUS |
|---|---|---|---|
| 1 | UENO Tarou | xxx.xxxx.xxxx.xxx | Conversation Finished |
| 2 | OTA Kouji | xxx.xxxx.xxxx.xxx | During Conversation |
| 3 | AZUMA Kyoko | xxx.xxxx.xxxx.xxx | Skip |
| 4 | ITO Hanako | xxx.xxxx.xxxx.xxx | Waiting |
| ---- | ---- | ---- | ---- |

FIG. 14

SYSTEM FOR CONTROLLING COMMUNICATIONS IN A NETWORK BASED ON A PREVIOUS PLACE NAME AND RELOCATED PLACE NAME DISPLAYED ON TERMINALS OF CURRENT CONVERSATION PARTICIPANTS

This application is a continuing application, filed under 35 U.S.C. §111(a), of International Application PCT/JP00/09123, filed Dec. 21, 2000.

BACKGROUND OF THE INVENTION (1) Field of the Invention

The present invention relates to a communication system, and more particularly to a communication system which is arranged to control communications in a network.

(2) Description of the Related Art

As a cellular phone and a personal handyphone system (called the PHS) are prevailing, more variable services for mobile terminals are being supplied. As one example, a location reporting system may be referred which operates to report a location of a mobile terminal to a center station. This system is arranged to receive the electric waves from the PHS, collect the location information contained in the electric waves, and report the location of the PHS to the center station.

The foregoing location reporting system, however, needs a troublesome operation of obtaining the location information from the center station through a terminal that has inquired its location. Moreover, what is executed by the center station is only to obtain the location of the mobile terminal and to passively report the obtained location in response to an access to be given by the location-inquired terminal. Hence, this location reporting system has been less practical.

On the other hand, the recent abrupt expansion of the Internet users results in increasing the traffics of IP packets. Further, the mobile terminals such as the cellular phones are prevailing more. These circumstances make the development of the fast IP communication in the mobile environment progressing quite rapidly.

Under these circumstances, a request is on the rise for easily utilizing a networking communication about the location information from a business or personal point of view.

SUMMARY OF THE INVENTION

The present invention is made in consideration of the foregoing respects. It is an object of the present invention to provide a communication system which makes it possible to efficiently and more easily control the communication in consideration of the location information of a mobile body.

In carrying out the foregoing object, a communication system is provided for controlling the communications in a network. This communication system includes a server having an address list managing unit for storing and managing an address list about a location of each registered member, an information supplying unit for generating the information on the address list and supplying the information on a Web site, and a call connecting unit for giving a call to a destination specified by the user for controlling a call connection; and a communicable mobile user terminal having a display device for displaying the information to be referenced on the Web site and a user interface having a screen on which a destination and a communication service type are to be specified.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a view showing a dialog box of a member registration/modification on the Web screen;

FIG. 12 is a view showing an address list to be indicated on the Web screen on the cellular phone;

FIG. 13 is a view showing a table including a latitude, a longitude and a place name of a FA;

FIG. 14 is a view showing a list of called members;

DESCRIPTION OF THE PREFERRED EMBODIMENTS

Figure 1:
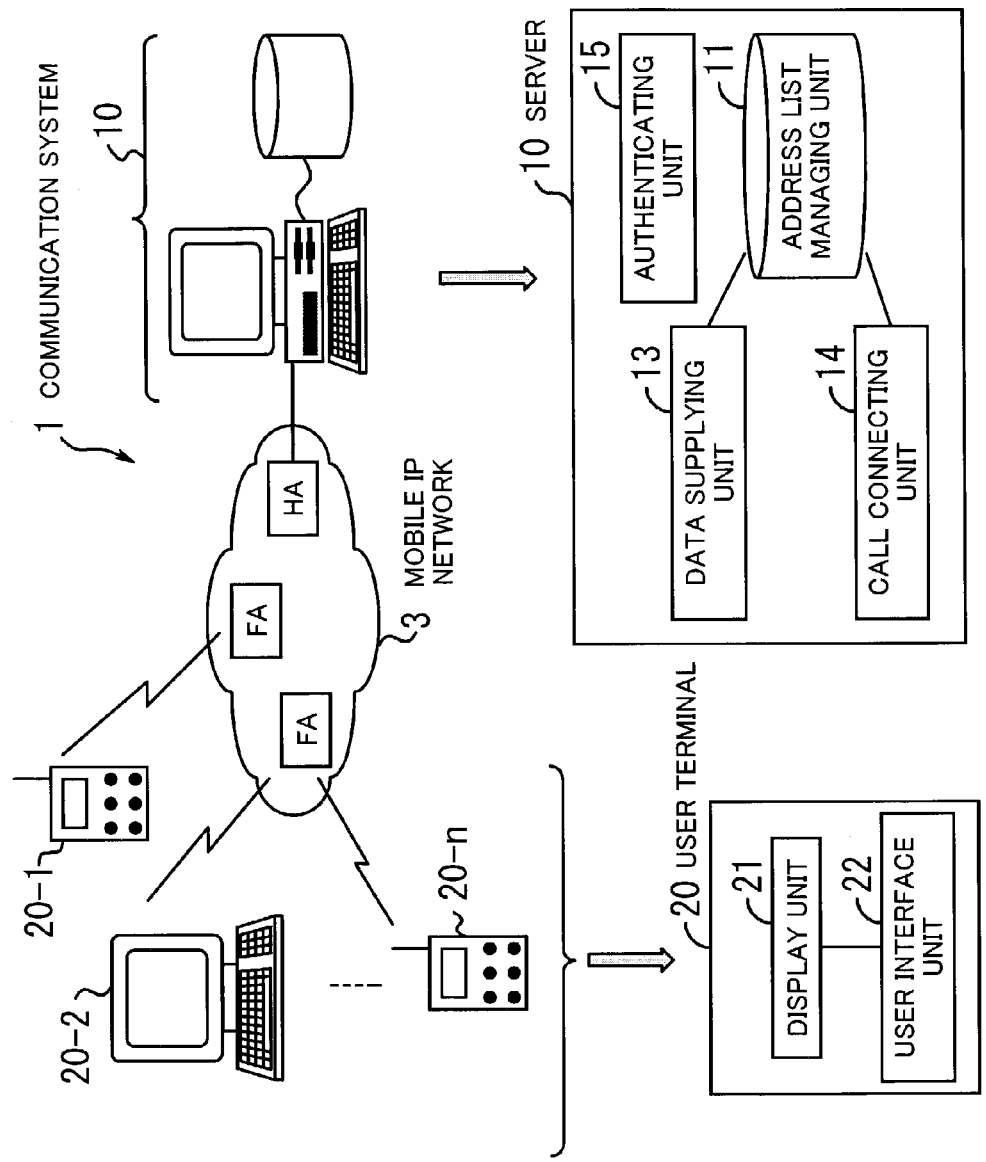
FIG. 1 is a principle view showing a principle of a communication system according to the present invention.

Hereafter, the embodiment of the present invention will be described with reference to the appended drawings. FIG. 1 illustrates a principle of the communication system according to the present invention. The communication system 1 is composed of a server 10 and a plurality of communicable mobile user terminals (mobile nodes) 20-1 to 20-n such as cellular phones or mobile PCs.

The server 10 is connected with a home agent (referred to as a HA) on a mobile IP network 3, while the user terminals 20-1 to 20-n (generically referred to as a user terminal 20) are wirelessly connected with foreign agents (referred to as FAs) on the mobile IP network 3.

The HA is located on a home network of a user terminal and is a node that delivers information destined for the user terminal or recognizes the location of the user terminal belonging to the corresponding FA. The FA is located on the network to which the user terminal is to be moved and is a node that reroutes the information delivered by the HA.

For the server 10, an address list managing unit 11 stores and manages the address list about the locations of the registered members (registered user terminals). That is, the address list managing unit 11 obtains an IP address of the FA in which the registered member exists from the HA and then converts the IP address according to the correspondence table composed of the latitude and the longitude. Further, the combination of the converted latitude and longitude is converted into the corresponding place name. The location of each member is managed as the place name on the list.

A data supplying unit 13 generates the data based on the address list and supplies the data to the user terminal 20 through the Web site. A call connecting unit 14 gives a call to a calling destination specified by the user terminal 20 for controlling a call connection. Concretely, the call connecting unit 14 connects a call with a caller who specifies the calling destination and originate the communication with the specified calling destination in response to an answer from the caller.

In this case, the call connecting unit 14 gives a call to all user terminals 20 or a plurality of selected user terminals 20 located in a specified area or group according to the user-operating procedure. (It may call only one member in the address list.)

An authenticating unit 15 controls authentication of each owner of the address list with an owner ID and a password. Further, for any user terminal except the owners of the address list, the authenticating unit 15 controls the authentication with the user ID and the stepwise input of the password.

Herein, assume that if the address list is divided into a plurality of groups g1 to gn, passwords Pg1 to Pgn are defined for the groups, respectively. In a case that a user tries to communicate with the group g1, at first, the user enters the user ID and the password P with which the system is to be used. After being authenticated, the user enters the password Pg1 corresponding with the group to be accessed. As described above, according to the present invention, the stepwise control of the authentication leads to enhancing the security of the address list.

A display unit 21 displays on a screen of the user terminal 20 the image of the data to be referenced on the Web site. This image includes a screen on which the current location and the registered member may be changed by the user.

The user interface unit 22 provides a user interface through which a calling destination (including an area and a group) and a communication service type (including an ordinary phone communication, a conference phone (party line), a character mail, a voice mail, and so forth) are to be specified and entered (by clicking a mouse, for example).

Figure 2:
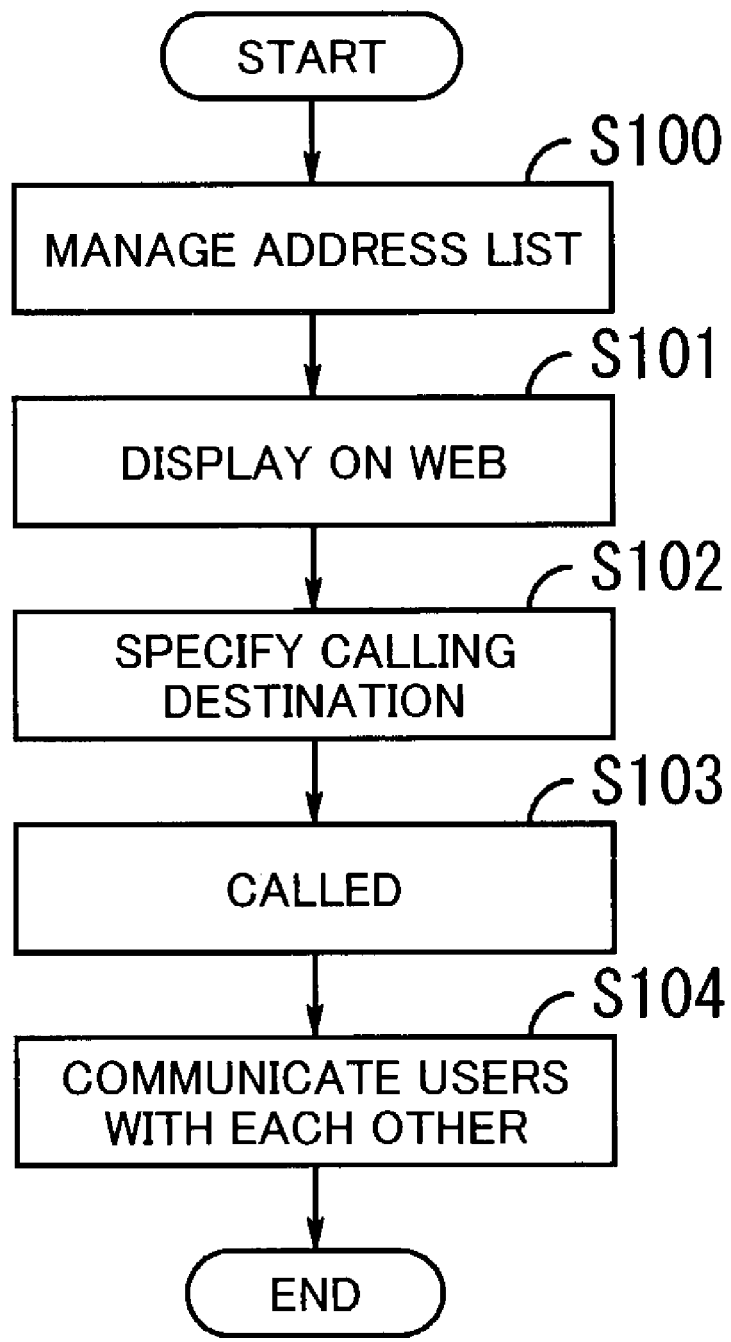
FIG. 2 is a flowchart showing the operation of the communication system.

FIG. 2 is a flowchart showing the operation of the communication system.

In step S100, the server 10 holds the address list of the user terminals 20 and manages the location of each user terminal 20.

In step S101, the user terminal 20 authenticated by the server 10 displays on the Web screen the data supplied by the server 10.

In step S102, the user terminal 20 specifies a member to be communicated therewith.

In step S103, the server 10 gives a call to all members (user terminals) or optionally selected members located in the specified area or group.

In step S104, the communication is executed between the users.

As set forth above, the communication system 1 according to the present invention is arranged to specify on the Web screen an area, a group, or a plurality of members to be called and give a call to the specified members in turn for connecting a call therewith. This makes it possible to provide a communication service based on the Internet. Throughout the communication service, if a user would like to communicate with a plurality of members, the user does not have to connect a call with each member one by one and thus may easily communicate with those members.

It should be noted that the single server 10 includes functions of managing an address list, supplying a data item through a Web site, and controlling a call connection in the above description, but these functions may be arranged to be distributed.

For example, a function of managing the address list is installed in the location server. A function of controlling a call connection is installed in a call agent (mail server if the character mail is used). Then, the application server that includes the functions supplied by the Web site and control the overall system is connected with the location server and the call agent through the API (Application Programming Interface). The group of those nodes may realize the function of the server 10.

In turn, the description will be oriented to the image of the Web screen the caller views. The Web screens shown in FIGS. 3 to 8 appears on the display of the personal computer. The Web screens shown in FIGS. 9 to 11 appears on the display of the cellular phone.

Figure 3:
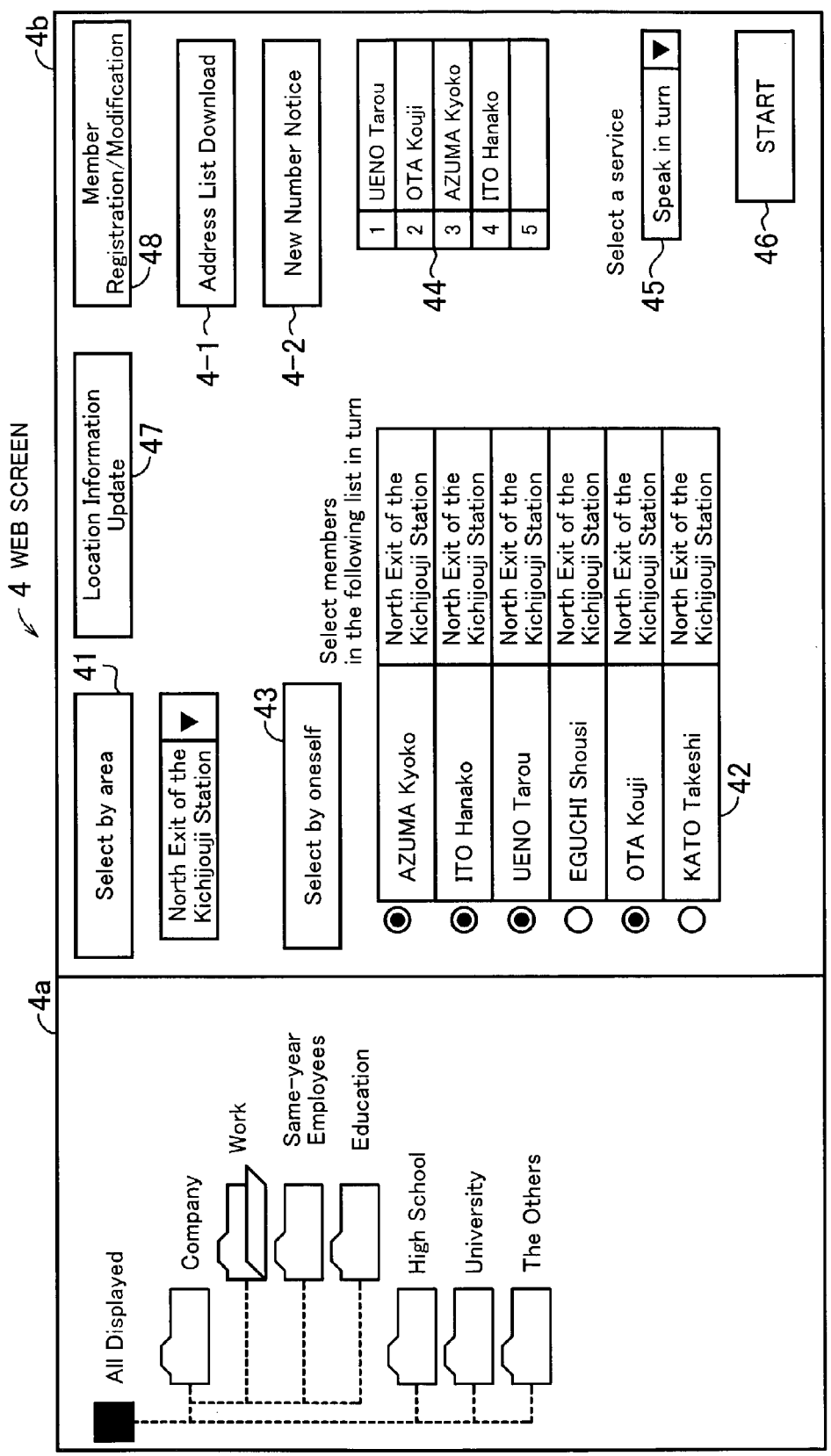
FIG. 3 is a view showing a screen image on a Web site.
Figure 4:
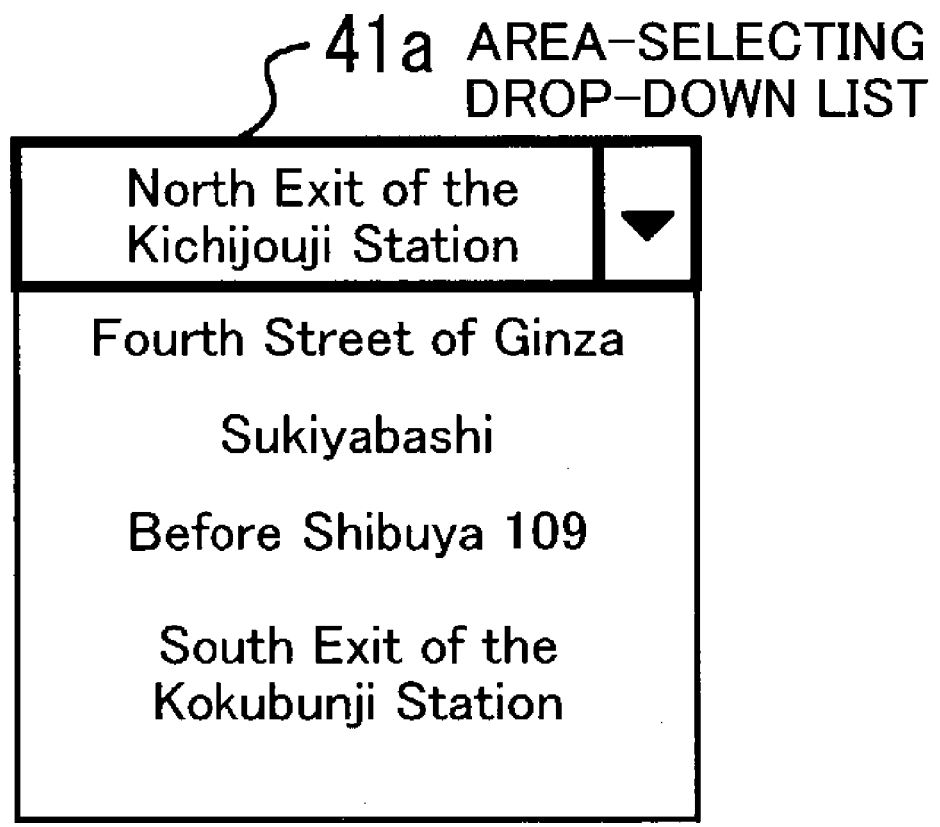
FIG. 4 is a view showing a drop-down menu of an area selection on the Web screen.
Figure 5:
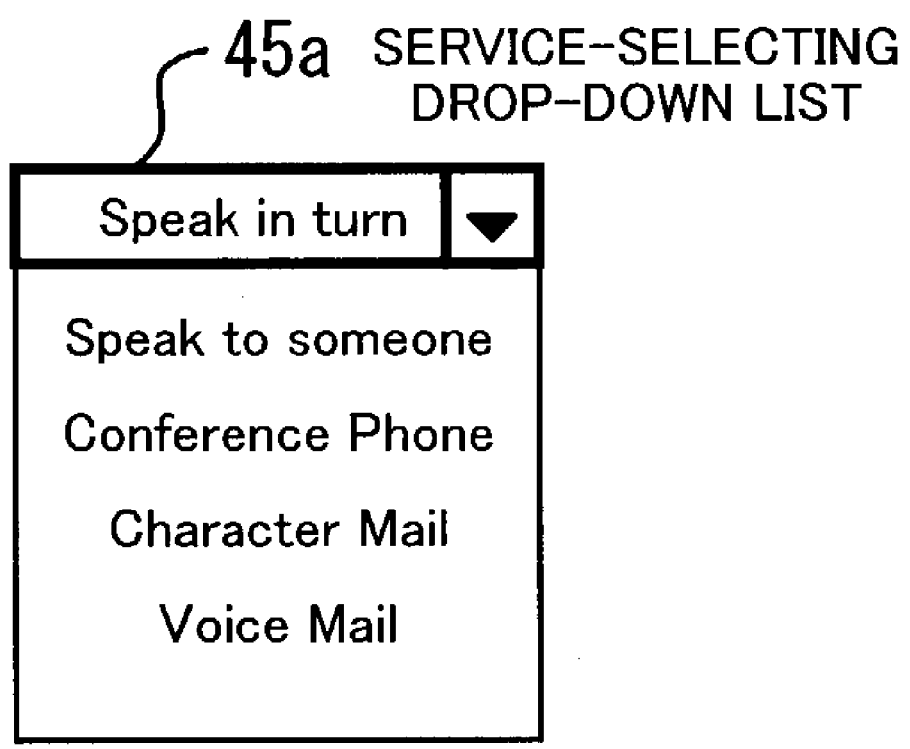
FIG. 5 is a view showing a drop-down menu of a service selection on the Web screen.

FIG. 3 shows an example of the Web screen. On a screen area 4a in the left hand of the Web screen 4, several groups are shown. Those groups correspond to the layers into which the members in the list are divided. In FIG. 3, the subgroup "work" in the group "company" is selected. (That is, the co-workers in the company are selected.)

On a screen area 4b in the right hand of the Web screen 4 includes buttons for specifying the members of the group of "work" (called a group A). If a button 41 of "select by area," an area-selecting drop-down list 41a is displayed (see FIG. 4). Then, the user selects an area. In FIG. 3, the North Exit of the Kichijouji Station is selected. At this time, a list of destination members 42 displays the members belonging to the group A currently located around the North Exit of the Kichijouji Station.

Then, the user presses a button 43 of "select by oneself" and then selects the member to be called in the list of destination members 42 by pressing a radio button. In the pressing sequence of the radio button, the names of the destination persons are displayed in turn in a list 44.

Unless the button 43 of "select by oneself" is pressed, a call is enabled to be given to all members in the list of destination members 42. The button 43 of "select by oneself" is used if the members are more defined in the list.

Then, a communication service type is specified on a service-selecting drop-down list 45a (see FIG. 5) of a service selecting column 45. As the communication types to be serviced, "speak in turn," "speak to someone" (selected if the user speaks to one person), "conference phone," "character mail," and "voice mail" are displayed. In FIG. 3, the "speak in turn" is selected. When a start button 46 is pressed, a pop-up dialog (to be discussed with reference to FIGS. 7 and 8) appears.

Further, a location information update button 47 is used for updating the location information. By pressing this button, the location information of the member is updated. A member registration/modification button 48 registers a new member in the address list or deletes the registered member from the address list. FIG. 6 shows a member registration/modification dialog box 48*a*. By completing necessary information in the member registration/modification dialog box 48*a*, the registered information can be easily changed.

Moreover, an address list download button 4-1 is a button by which the address list held in the server 10 is downloaded. This function eliminates the necessity of accessing the server 10 in each call, which leads to lessening the load of the traffics.

A new number notice button 4-2 is a button that operates to broadcast the ID number of the user terminal. By pressing this button, a pop-up dialog box for entering an ID appears (not shown). This function makes it possible to easily notice the ID when the user purchased a new terminal. The broadcast of the ID can be executed similarly also by the server 10. Further, the ID can be broadcasted only to persons who have a permission to receive the ID.

Figure 7:
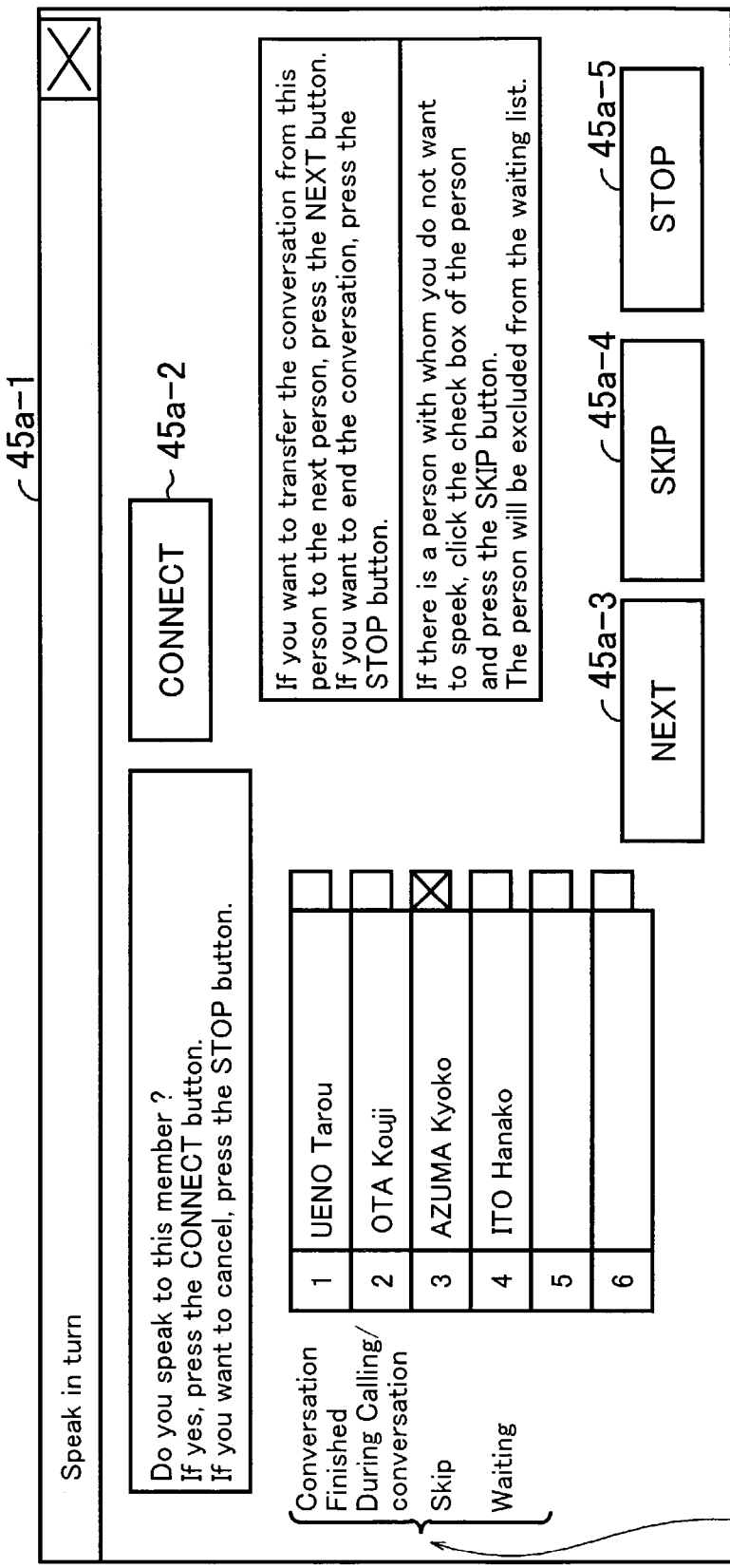
FIG. 7 is a view showing a pop-up dialog box on the Web screen.

FIG. 7 illustrates a pop-up dialog box. When the "speak in turn" is selected in the service-selecting drop-down list 45*a*, a pop-up dialog box 45*a*-1 appears on the screen.

Herein, when an operator presses a connect button 45*a*-2, a calling process is started and connected to the first member "UENO Tarou." Then the operator can speak to "UENO Tarou." If the operator speaks to the second or later member after the conversation is over, a next button 45*a*-3 is pressed.

In a case that the operator decides that there is no need to communicate a certain member at this stage, it is possible to skip the target member to the next one by clicking a check box of the member and pressing a skip button 45*a*-4. (In FIG. 7, "AZUMA Kyoko" is skipped.) If the operator wants to terminate the call, he/she presses a stop button 45*a*-5. In actual, a display for indicating a communicating state (such as "conversation finished" or "skip") in the pop-up dialog box 45*a*-1 is displayed in a picture or a pattern from which any one can understand the state.

Figure 8:
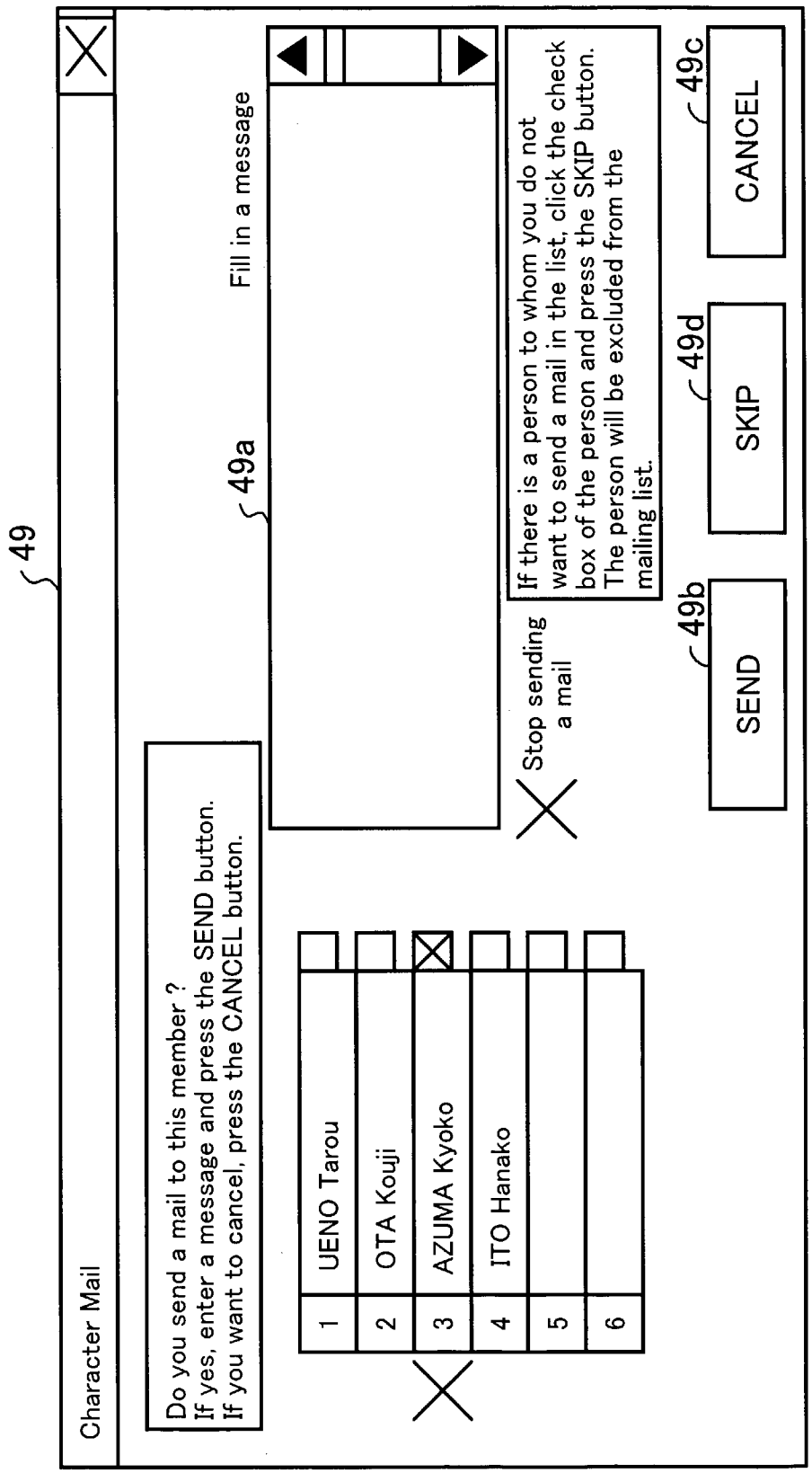
FIG. 8 is a view showing a pop-up dialog box on the Web screen.

FIG. 8 illustrates a pop-up dialog box. When the "character mail" is selected in the service-selecting drop-down list 45*a* shown in FIG. 5, a pop-up dialog box 49 appears on the screen.

Herein, when the operator enters a message in a message entry box and presses a send button 49*b*, a calling process is started and a call is connected to the shown members. Then the character mail is transmitted to the member.

If the operator cancels the transmission of the message, he/she presses a cancel button 49*c*. Further, in a case that the operator decides that there is no need to send the character mail to a certain member at this stage, he/she clicks a check box of the member and presses a skip button 49*d*. Then the character mail is not sent to that member. (In FIG. 8, the "AZUMA Kyoko" is skipped.)

In the other services such as the conference phone and the voice mail, the screen composition and the operating procedure of the pop-up dialog box are basically similar to the foregoing screen. Hence, the description thereof is omitted.

Figure 9:
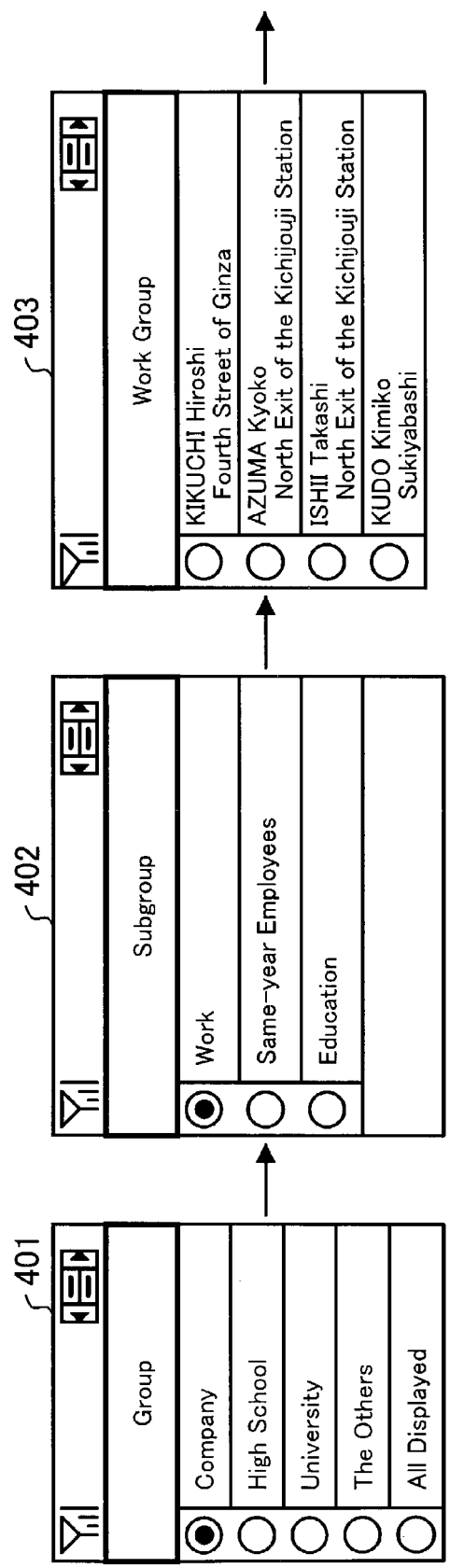
FIG. 9 is a view showing a Web screen image on a cellular phone.
Figure 10:
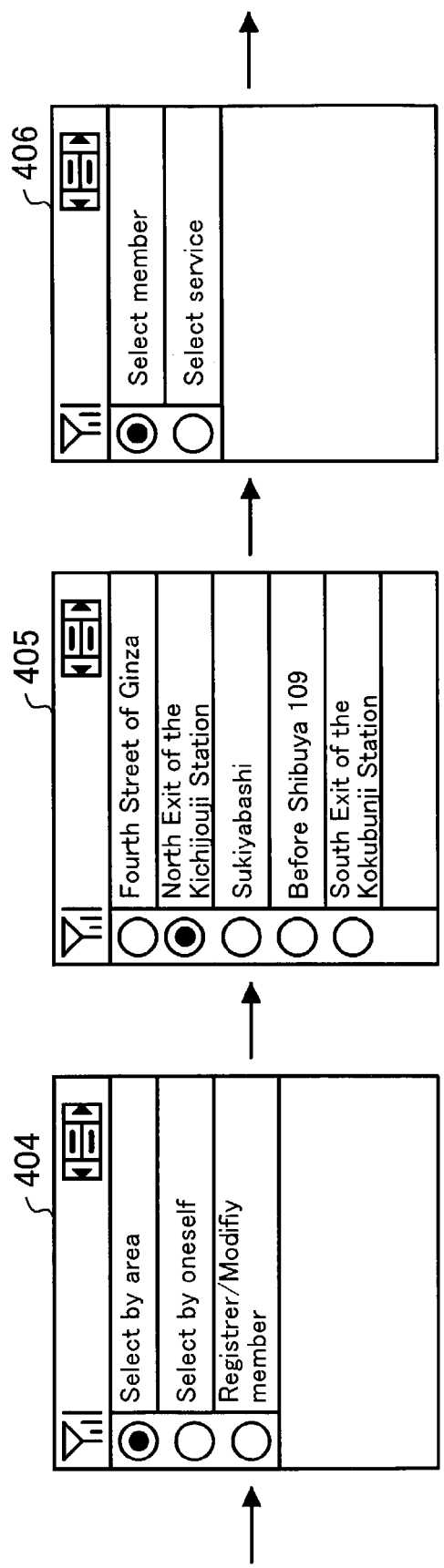
FIG. 10 is a view showing a Web screen image on a cellular phone.
Figure 11:
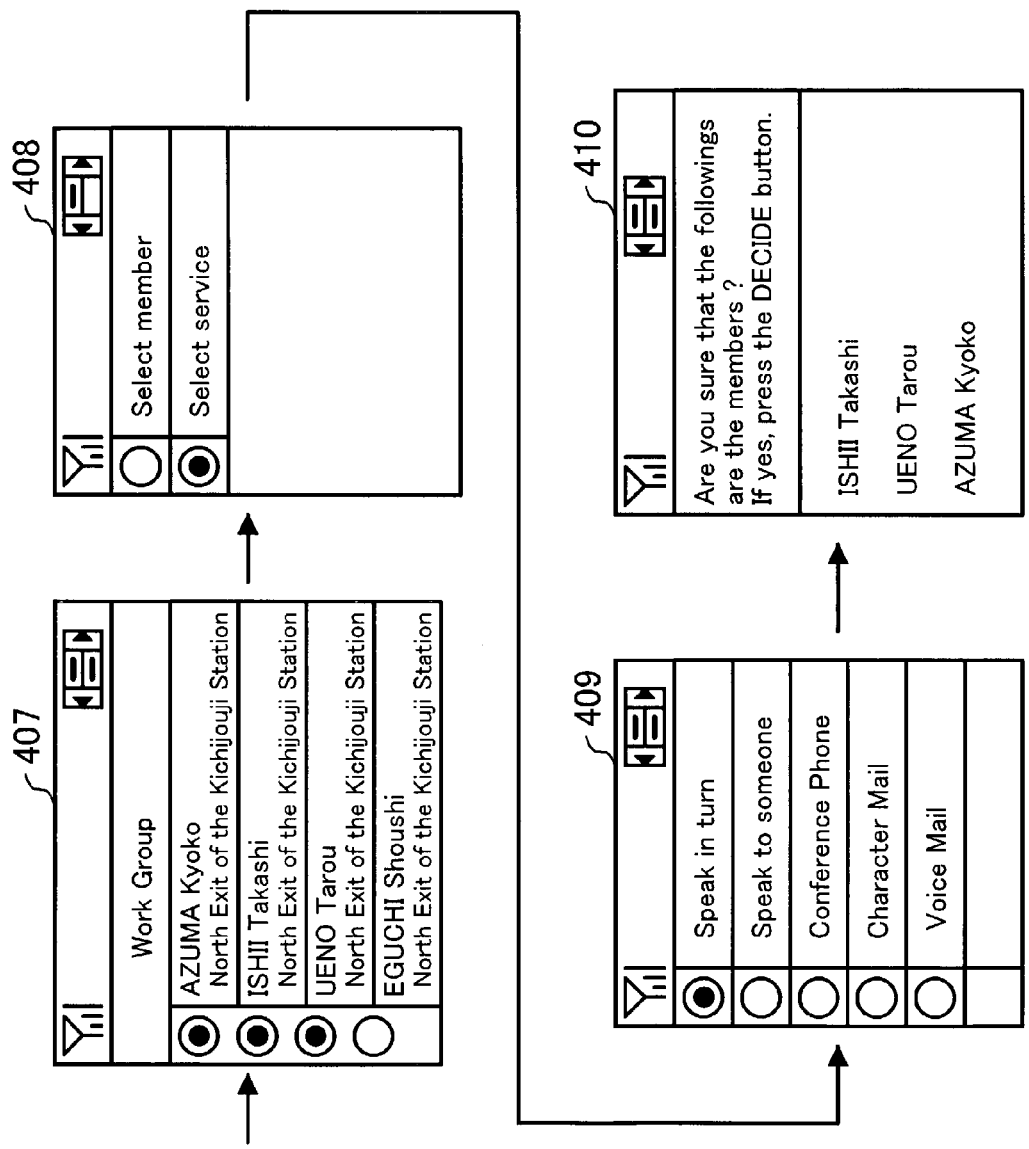
FIG. 11 is a view showing a Web screen image on a cellular phone.

FIGS. 9 to 11 illustrate examples of Web screens on a cellular phone. At first, it is assumed that a group selecting screen 401 is displayed and the "company" is selected. Then, a subgroup screen 402 appears and the "work" is selected. Afterwards, a work group 403 is displayed, in which names and current locations of registered members are displayed.

Then, the screen is scrolled to a screen 404. The screen 404 shows three items of "select by area," "select by oneself," and "register/modify a member." By selecting the item of "select by area," a screen 405 appears. The screen 405 shows a location of the registered member. Herein, it is assumed that the "North Exit of the Kichijouji Station" is selected. Then, a screen 406 appears. The screen 406 shows two items of "select a member" and "select a service." Herein, it is assumed that the "select a member" is selected.

Next, a screen 407 appears. The screen 407 shows the members of the work group located nearby the North Exit of the Kichijouji Station. Further, on this screen, a destination person is selected. Then, a screen 408 appears. On the screen 408, the "select a service" is selected.

A screen 409 is displayed. The screen 409 shows various kinds of communication services. In FIG. 11, the "speak in turn" is selected. Next, on a screen 410, the final check is executed. By pressing the decide button, the user can speak to the destination persons shown on the screen 410 in turn.

Referring next to FIG. 12, an address list 110 will be described. The address list 110 is composed of six items, that is, a group 11*a*, a subgroup 11*b*, a member 11*c*, an address 11*d* (corresponding to an IP address of the FA or the HA), a location 11*e*, and an ID number notice 11*f*. The ID number notice 11*f* is a column indicating whether or not an ID is broadcasted to each member. The ID is noticed to only the members with OK. The address list shown in FIG. 12 is provided for each owner and is managed by the address list managing unit 11.

FIG. 13 shows a table t1 in which the latitude and the longitude of each FA correspond with a place name. In the table t1, the location of the actual place name corresponds with the latitude and the longitude of each FA connected with the user terminal 20. This table t1 determines the location 11*e* of the address list 110.

FIG. 14 shows a list of called members t2. The foregoing address list 110 and the table t1 are static, while the list of called members t2 is dynamically generated within the server 10 when the destination person is selected on the user terminal 20.

The list of called members t2 includes as its items a member, an address (corresponding to an IP address of the FA or the HA), and a status. The status is a column indicating the communication state of each member. The list of called members t2 composed of only the members required for a call connection, is dynamically generated. This eliminates the necessity of accessing the members of the address list one by one, thereby reducing the load of the processing and thus enhancing the processing efficiency.

Figure 15:
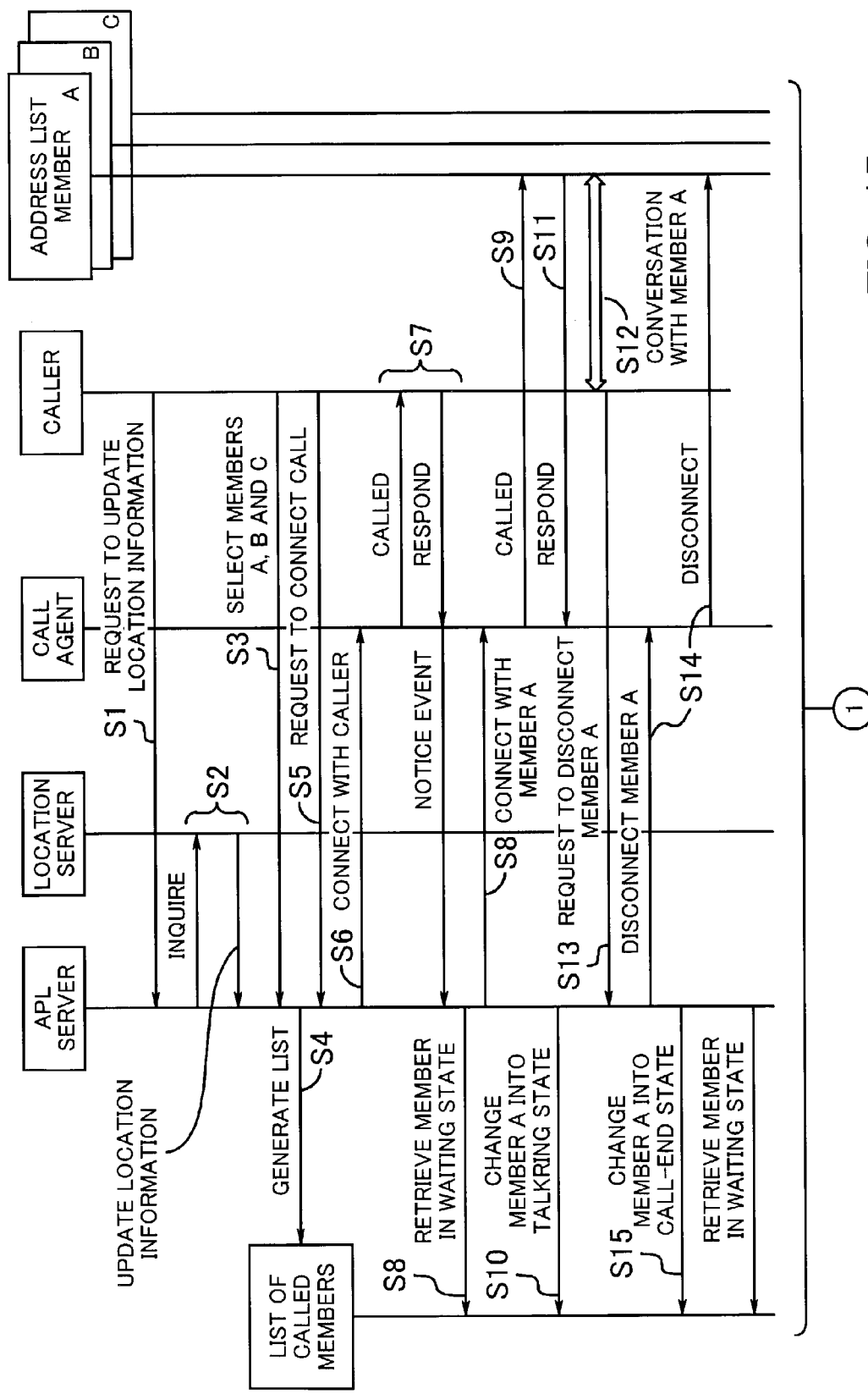
FIG. 15 is a sequence view showing an operation of "speak in turn"
Figure 16:
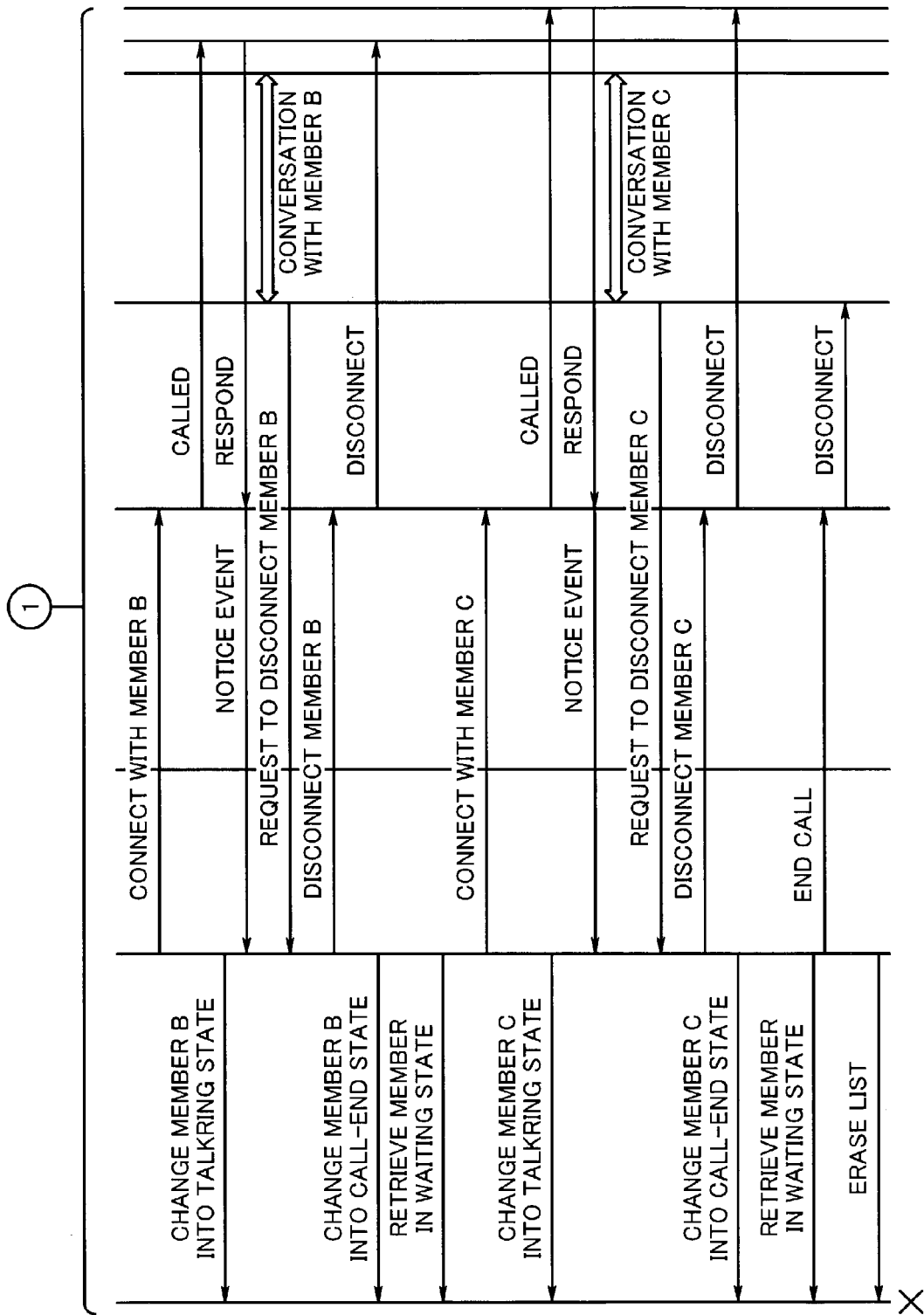
FIG. 16 is a sequence view showing an operation of "speak in turn"

In turn, the description will be oriented to the services provided by the present invention, shown in the foregoing service-selecting drop-down list 45*a* with reference to sequence views. FIGS. 15 and 16 show an operation sequence of the "speak in turn." In the following description, the function of the server 10 is distributed into an APL (Application) server, a location server, and a call agent (or mail server).

[S1] A caller sends a request for updating a location information of a member in the address list to the APL server.

[S2] The APL server sends an inquiry to the location server. The location server updates the location information in the APL server.

[S3] The caller selects members A, B and C as destinations and notifies the APL server of these members.

[S4] The APL server generates a list of called members.

[S5] The caller sends a request for a call connection to the APL server.

[S6] The APL server notifies the call agent to connect with the caller.

[S7] The call agent gives a call to the caller, while the caller responds to the call agent. Then, the call agent notifies the APL server of an event.

[S8] The APL server retrieves the member A in a waiting state from the list of called members and then notifies the call agent to connect with the member A.

[S9] The call agent gives a call to the member A.

[S10] The APL server put the member A into the TalkRing state. The TalkRing indicates the communication state including in the middle of calling/speaking.

[S11] The member A responds to the call agent.

[S12] The caller speaks to the member A.

[S13] When the conversation is over, the caller sends a request for disconnecting the member A to the APL server.

[S14] The APL server notifies the call agent to disconnect the member A. Then the call agent disconnects the member A.

[S15] The APL server puts the member A into a call-end state. Later, the similar process is executed for the members B and C. (The description thereof is omitted). When the conversations with all members A, B and C come to an end, the list of called members used for controlling calls for these members is erased.

Figure 17:
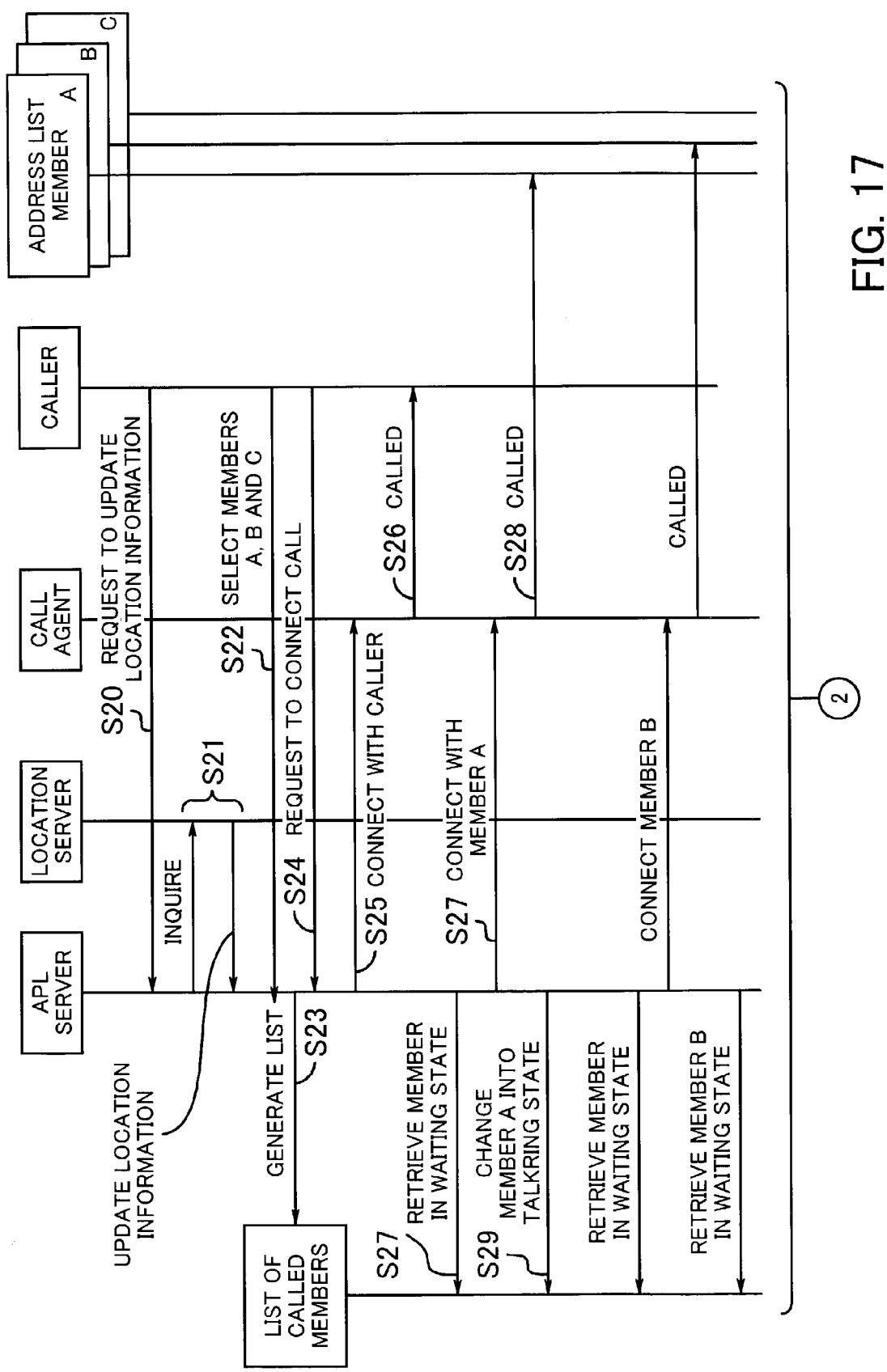
FIG. 17 is a sequence view showing an operation of "conference phone"
Figure 18:
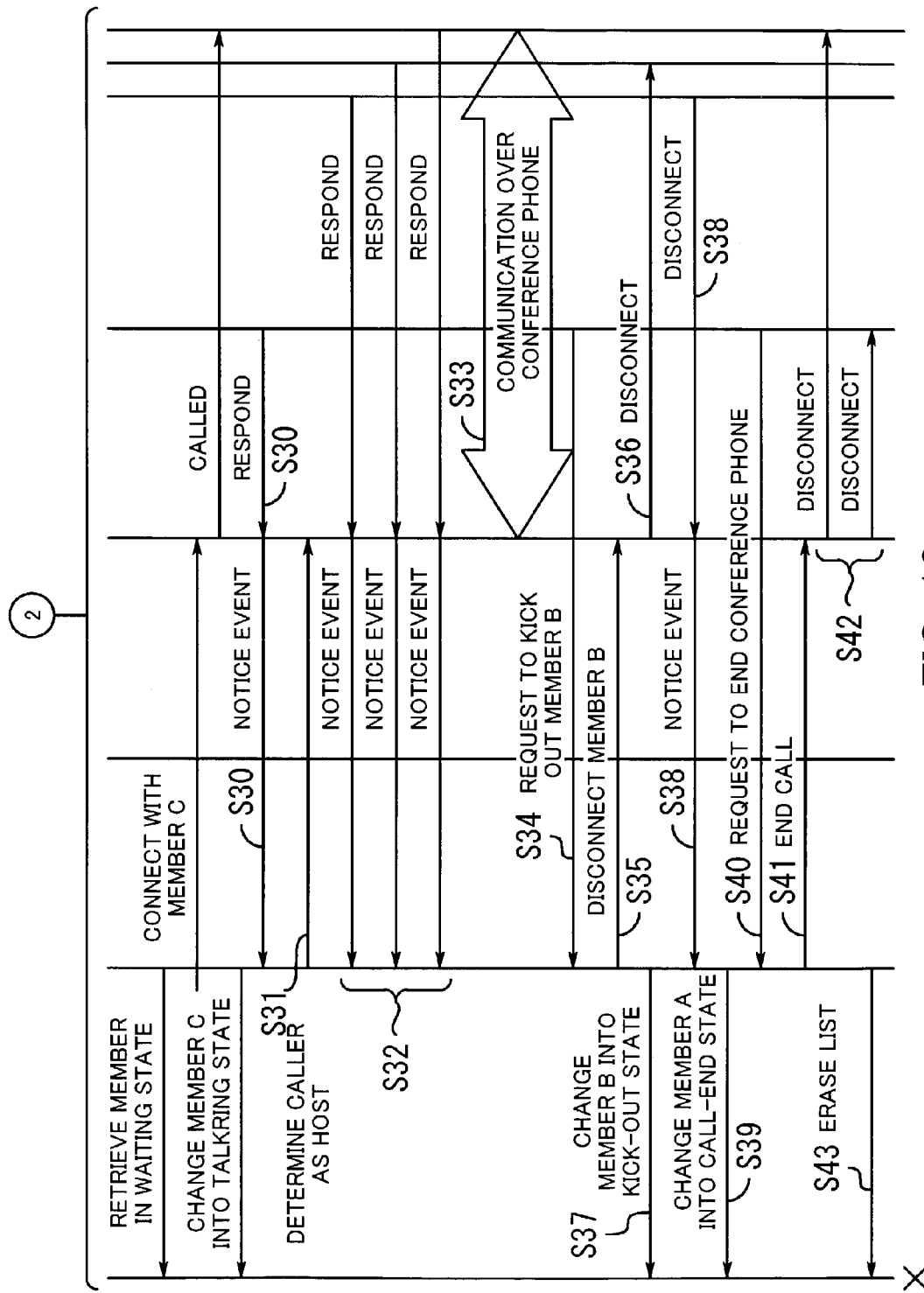
FIG. 18 is a sequence view showing an operation of "conference phone"

FIGS. 17 and 18 are views showing an operation sequence of the "conference phone."

[S20] A caller sends a request for updating a location information of a member in an address list to an APL server.

[S21] The APL server sends an inquiry to a location server, while the location server updates the location information in the APL server.

[S22] The caller selects members A, B and C as destinations and then notifies the APL server of these members.

[S23] The APL server generates a list of called members.

[S24] The caller sends a request for a call connection to the APL server.

[S25] The APL server notifies a call agent to connect with the caller.

[S26] The call agent gives a call to the caller.

[S27] The APL server retrieves the member A in a waiting state from the list of called members and notifies the call agent to connect with the member A.

[S28] The call agent gives a call to the member A.

[S29] The APL server puts the member A into a TalkRing state. Later, the similar processes to those of the steps S27 to S29 are executed for giving a call to the member B or C.

[S30] The caller responds to the call agent. The call agent notifies the APL server of an event.

[S31] The APL server specifies the caller as a host.

[S32] The responses from the members A, B and C are sent to the call agent. The event notice of each member is sent from the call agent to the APL server.

[S33] Over the conference phone, the caller and the members A, B and C communicate with each other.

[S34] The caller requests the APL server to kick out the member B (that is, to exclude the member B from the conference phone).

[S35] The APL server notifies the call agent to disconnect the member B.

[S36] The call agent disconnects the member B.

[S37] The APL server puts the member B in the kick-out state.

[S38] When the communication comes to an end, the member A notifies the call agent to disconnect the call. The call agent notifies the APL server of an event.

[S39] The APL server puts the member A into a call-end state.

[S40] The caller sends a request for ending up the conference phone to the APL server.

[S41] The APL server notifies the call agent of the end of the call.

[S42] The call agent disconnects the member C from the caller.

[S43] The APL server erases the list of called members.

Figure 19:
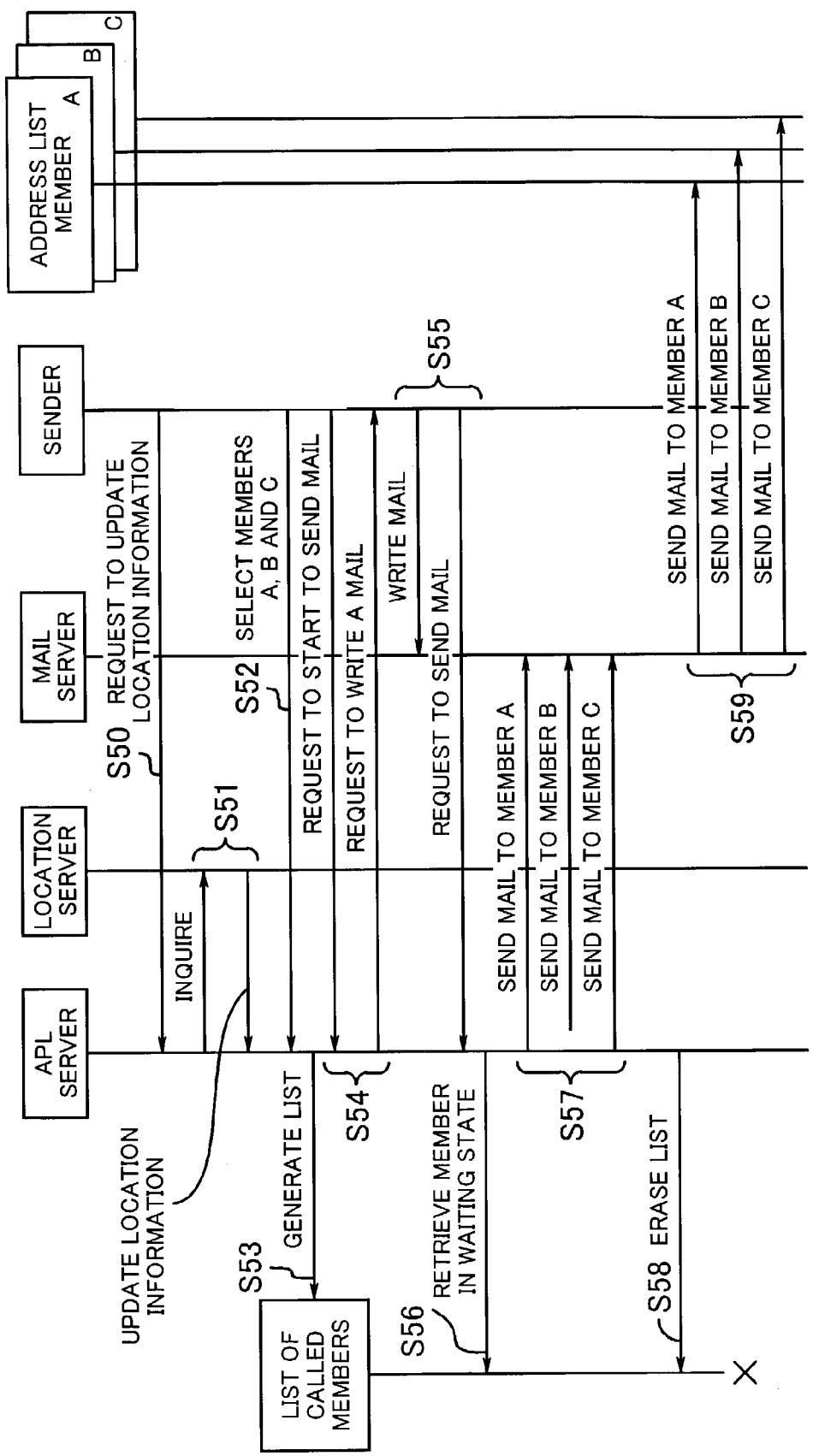
FIG. 19 is a sequence view showing an operation of "character mail"

FIG. 19 shows an operation sequence of the "character mail."

[S50] A sender sends a request for updating a location information of a member in an address list to an APL server.

[S51] The APL server sends an inquiry to a location server. The location server updates the location information in the APL server.

[S52] The sender selects members A, B and C as destinations and notifies the APL server of these members.

[S53] The APL server generates a list of called members.

[S54] The sender sends to the APL server a request for starting to send a mail. In response to the request, the APL server sends a request for writing a mail to the sender.

[S55] The sender writes the mail in the mail server and sends a request for sending the mail to the APL server.

[S56] The APL server retrieves the members A, B and C in a waiting state from the list of called members.

[S57] The APL server notifies the mail server to send the mail to the members A, B and C.

[S58] The APL server erases the list of called members.

[S59] The mail server transmits the mail to the members A, B and C.

Figure 20:
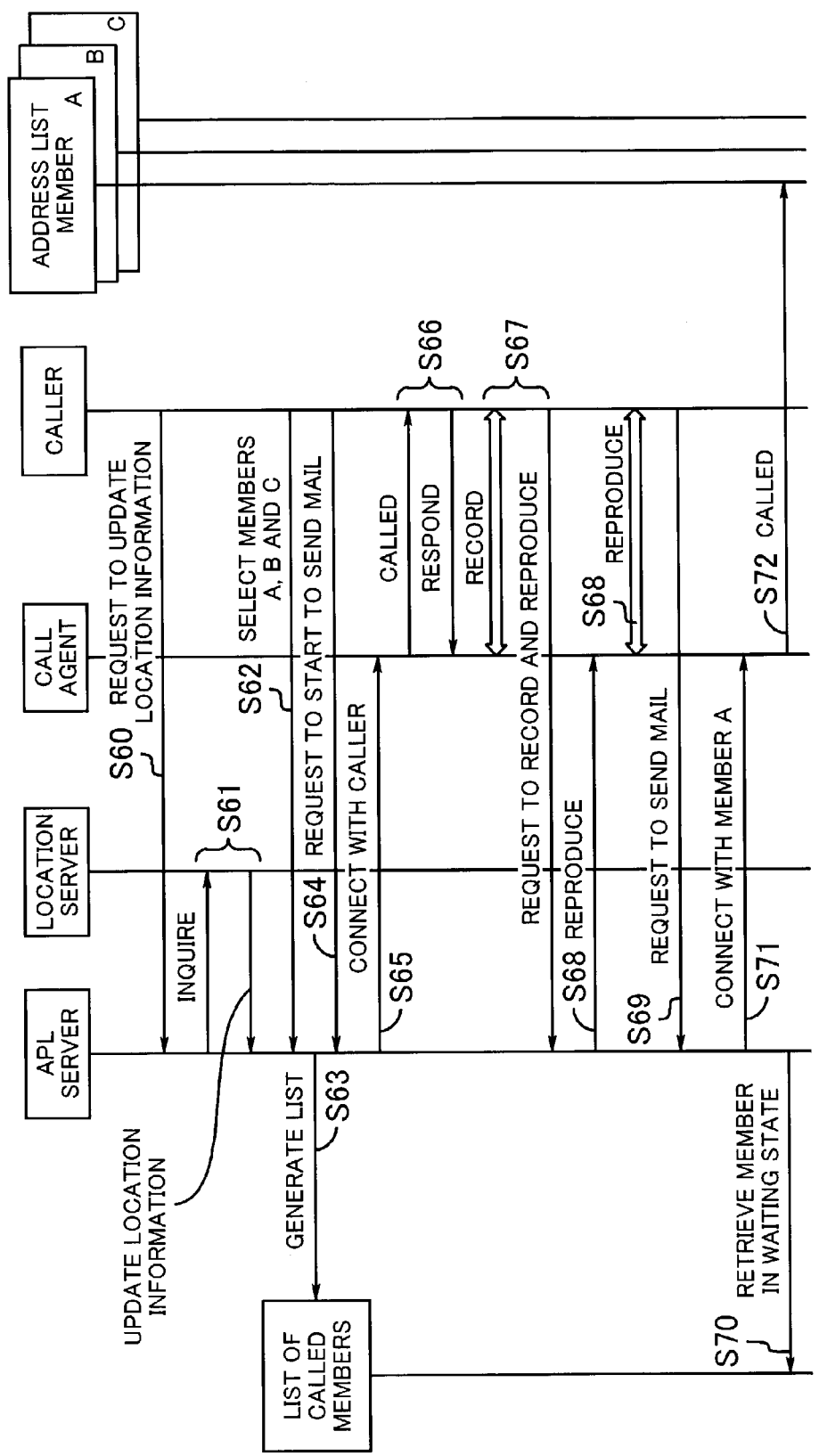
FIG. 20 is a sequence view showing an operation of "voice mail"
Figure 21:
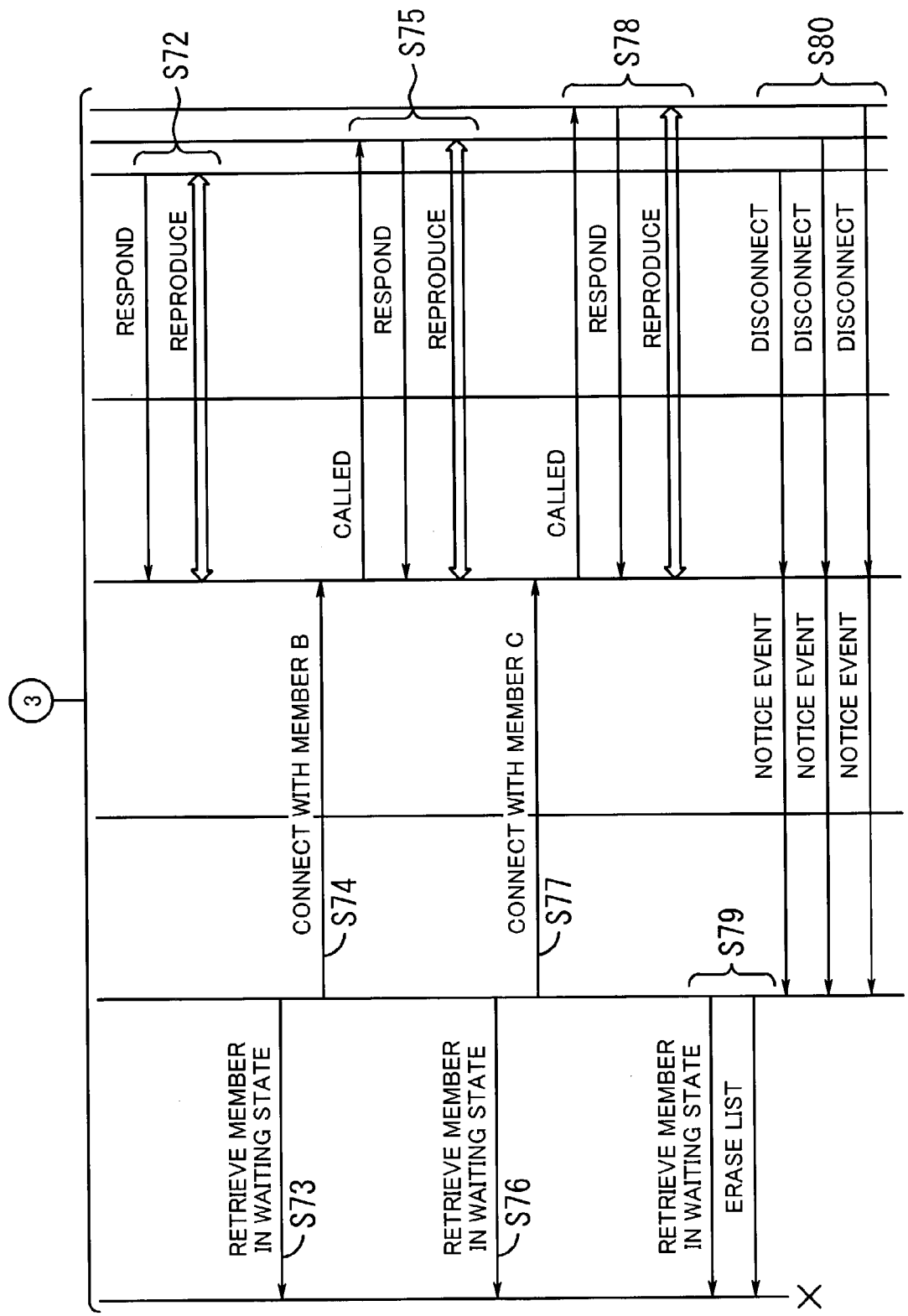
FIG. 21 is a sequence view showing an operation of "voice mail"

FIGS. 20 and 21 show an operation sequence of the "voice mail."

[S60] A caller sends a request for updating a location information of a member in an address list to an APL server.

[S61] The APL server sends an inquiry to a location server, while the location server updates the location information in the APL server.

[S62] The caller selects members A, B and C as destinations and notifies the APL server of these members.

[S63] The APL server generates a list of called members.

[S64] The caller sends to the APL server a request for starting to send a mail.

[S65] The APL server notifies a call agent to connect with the caller.

[S66] The call agent gives a call to the caller. The caller responds to the call agent.

[S67] The caller records the voice and notifies the APL server of a request for recording and reproducing the voice.

[S68] The APL server notifies the call agent to reproduce the voice and the caller reproduces the voice.

[S69] The caller notifies the APL server of a request for sending a mail.

[S70] The APL server retrieves the member A in a waiting state from a list of called members.

[S71] The APL server notifies the call agent of the connection with the member A.

[S72] The call agent gives a call to the member A. The member A gives back a response to the call agent and reproduces the voice recorded by the caller.

[S73] The APL server retrieves the member B in the waiting state from the list of called members.

[S74] The APL server notifies the call agent of the connection with the member B.

[S75] The caller agent gives a call to the member B. The member B gives back a response to the call agent and reproduces the voice recorded by the caller.

[S76] The APL server retrieves the member C in the waiting state from the list of called members.

[S77] The APL server notifies the call agent of the connection with the member C.

[S78] The call agent gives a call to the member C and the member C gives back a response to the call agent and reproduces the voice recorded by the caller.

[S79] The APL server retrieves the member in the waiting state from the list of called members. In the example shown in FIG. 21, no member in the waiting state is found. Hence, the list of called members is erased.

[S80] The members A, B and C notifies the call agent to disconnect the calls. Then, the call agent notifies the APL server of an event.

Figure 22:
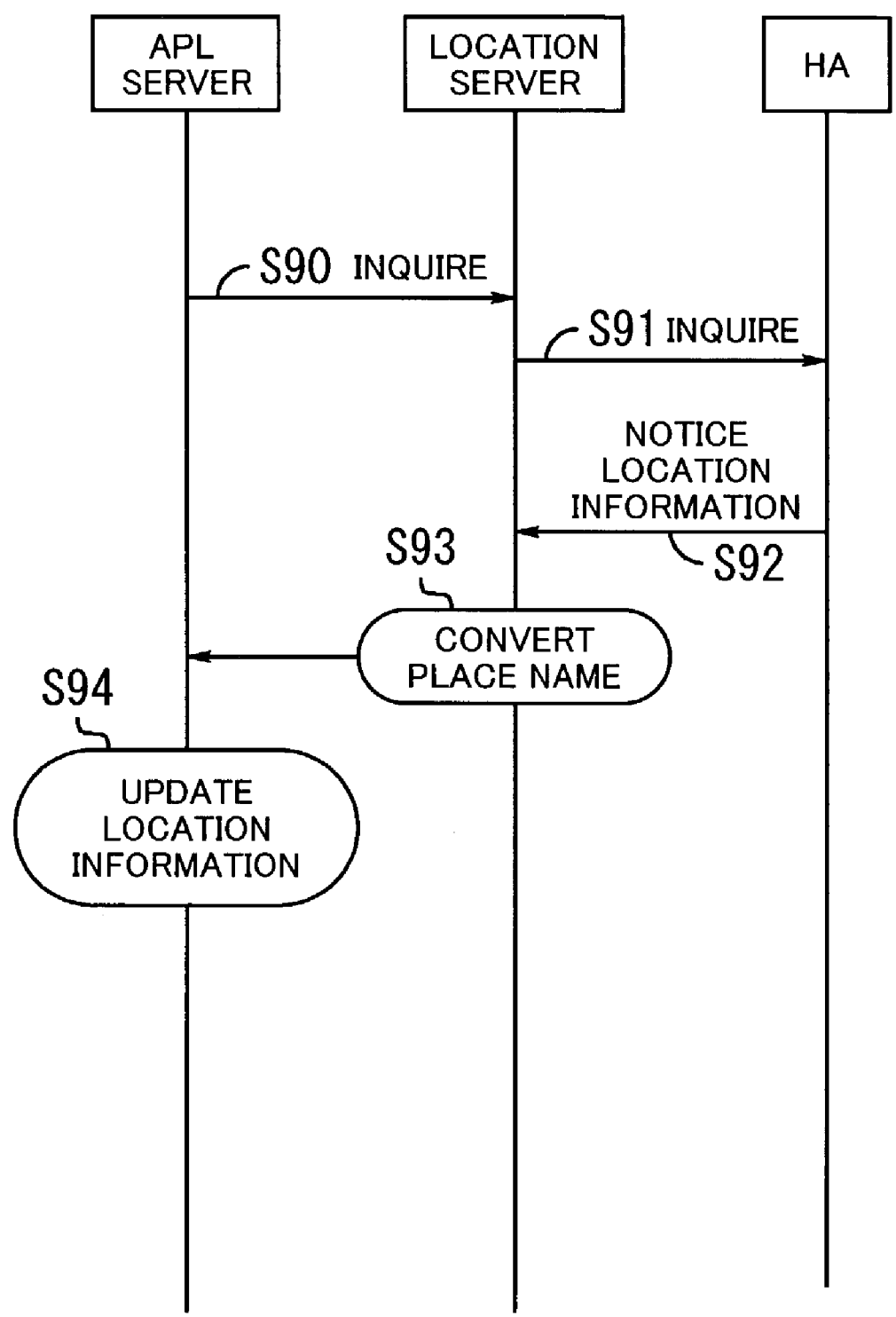
FIG. 22 is a sequence view showing a procedure of updating location information.

In turn, the description will be oriented to the update of the location information. FIG. 22 is a sequence view showing the procedure of updating the location information.

[S90] The APL server sends an inquiry of the address of a member (corresponding to an IP address of a FA to which the concerned member belongs) in the address list to the location server.

[S91] The location server inquires the HA of the address of the member in the address list.

[S92] The HA notifies the location server of the inquired address.

[S93] The location server converts the address received from the HA into the latitude and the longitude and further the place name to update the address list.

[S94] The APL server receives the name of the place where the concerned member is located from the location server and then updates the Web screen.

Since the APL server outputs a notice of a request for changing the location information at regular periods, the notice of the request for changing the location information is sent in the sequence of the APL server, the location server, and the HA. If the location information is changed, the APL server receives the information about the change of the location in the sequence of the HA, the location server, and the APL server.

When the APL server receives the change of the location information during conversation, the name of the member whose location is changed, the previous place name, and the relocated place name are displayed in the pop-up dialog on the user terminals of the current conversation participants.

In turn, the description will be oriented to the way of use of the present invention. As an example of use in business, the invention may be used for a security company. The security company specifies an area where a problem is arising and transmit a message to all security guards patrolling the area, so that those security guards can reach the scene smoothly.

Also, the invention may be used for a taxi company. The taxi company specifies an area requested by a customer and transmit a message to all cars located within the area. As a result, an appropriate car can pick up the customer. Also, it is possible to transmit a message to the cars in order to distribute the cars over the area effectively.

Further, the invention can be also used for viewing the locations of all sales staffs working outside. Hence, it is possible to specify a location and transmit the location information to a staff who is appropriate for the location information to a customer or to transmit a proper message suitable for the location information to each sales staff.

On the other hand, as an example of personal use, if a user specifies a meeting spot or a place where friends ordinarily meet, the user can contact with the friends located in the specified place.

Further, if a user specifies an area where the user is located or an area where the user intend to go, the user can ask his/her friends located nearby the area to an alcoholic party, a movie, or the like. The present invention allows the friends who are conscious of their location information to be more associated with one another through the use of the communication.

As set forth above, in the communication system 1 according to the present invention, the server 10 manages the location informations of the mobile bodies or the members registered in the address list in each group set by the user. On the user terminal 20, the user may refer to the location informations of the members registered in the address list and the address list including the concerned belonging groups on the Web site and click the destination member as being conscious of the location information of the member and the belonging group for starting to speak to the member.

The present invention therefore makes it possible to efficiently and easily execute the network communication associated with the location information from a business aspect as well as a personal aspect.

As described above, the communication system according to the present invention is arranged to generate the data based on the address list of the registered members, disclose the data on the Web site, and give a call to a destination member specified by the user terminal to control a call connection. This arrangement makes it possible to efficiently and easily control the communication as being conscious of the location information of each mobile body, thereby making the communication service more convenient.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication system for controlling communications in a network, comprising:
   a server including address list managing means for storing and managing an address list including a location of each registered member, and when a member is selected by a user, dynamically generating a list of members to be called based upon a correspondence of location of the selected member and locations from the address list, data supplying means for generating data based on the list of members to be called and supplying the data on a Web site, and call connecting means for giving a call to a destination member specified on a user side, for controlling a call connection;
   a plurality of user terminals, each including display means for displaying a screen image of the data to be referenced on the Web site and user interface means for providing a user interface through which the destination member and a communication service type are specified and entered on the screen image; and
   wherein when the server receives a change of a location information during conversation, the server updates Web screens of user terminals of current conversation participants, and a name of a member whose location is changed, a previous place name, and a relocated place name are displayed in pop-up dialog on the user terminals of current conversation participants.

2. The communication system according to claim 1, wherein said call connecting means gives a call to user terminals located in a specified area or group or optionally selected user terminals in turn.

3. The communication system according to claim 1, wherein said call connecting means controls a call connection about at least one of a phone communication, a conference phone, a character mail, and a voice mail as the communication service types.

4. The communication system according to claim 1, wherein the server further includes authenticating means for authenticating an owner of the address list and said user terminal through a stepwise input of a password.

5. The communication system according to claim 1, wherein said user terminal displays a current location of the member and controls change of the registered member in addition to specifying the destination member and the communication service type.

6. The communication system according to claim 1, wherein said user terminal downloads the address list and controls a calling operation through the use of the downloaded address list.

7. The communication system according to claim 1, wherein said server or said user terminal broadcasts its own ID.

8. A communication system for controlling communications in a network, comprising:
   a location server including address list managing means for storing and managing an address list including a location of each registered member, and when a member is selected by a user, dynamically generating a list of members to be called based upon a correspondence of location of the selected member and locations from the address list;
   a call agent including call connecting means for giving a call to a destination member specified on the user side, for controlling a call connection;
   an application server including a data supplying means for generating data based on the list of members to be called and supplying the data on a Web site, and controlling an overall system connected with the location server and the call agent through an application programming interface;
   a plurality of user each including displaying means for displaying a screen image of the data to be referenced on the Web site and user interface means for providing a user interface through which the destination member and a communication service type are specified and entered on the screen image; and
   wherein when the application server receives a change of a location information during conversation, the application server updates Web screens of user terminals of current conversation participants, and a name of a member whose location is changed, a previous place name, and a relocated place name are displayed in pop-up dialog on the user terminals of current conversation participants.

* * * * *